US012719100B2

(12) United States Patent
Sakai et al.

(10) Patent No.: US 12,719,100 B2
(45) Date of Patent: Aug. 25, 2026

(54) HIGH-VOLTAGE AUXILIARY SYSTEM AND ELECTRONIC CONTROL DEVICE

(71) Applicant: DENSO CORPORATION, Kariya-city (JP)

(72) Inventors: Koji Sakai, Kariya-city (JP); Toshitada Sanzen, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/789,789

(22) Filed: Jul. 31, 2024

(65) Prior Publication Data

US 2024/0396113 A1 Nov. 28, 2024

Related U.S. Application Data

(63) Continuation of application No. PCT/JP2023/018138, filed on May 15, 2023.

(30) Foreign Application Priority Data

Jun. 9, 2022 (JP) ................................ 2022-093840

(51) Int. Cl.
*H01M 10/625* (2014.01)
*B60L 1/00* (2006.01)
(Continued)

(52) U.S. Cl.
CPC ........... *H01M 10/625* (2015.04); *B60L 1/003* (2013.01); *B60L 58/27* (2019.02); *H01M 10/613* (2015.04);
(Continued)

(58) Field of Classification Search
CPC ............ H01M 10/625; H01M 10/613; H01M 10/615; H01M 10/637; H01M 10/6569;
(Continued)

(56) References Cited

U.S. PATENT DOCUMENTS 6,078,163 A 6/2000 Horie et al.
2010/0085019 A1 4/2010 Masuda
(Continued)

FOREIGN PATENT DOCUMENTS

CN 111219847 A 6/2020
JP H053624 A 1/1993
(Continued)

*Primary Examiner* — Jelani A Smith
*Assistant Examiner* — Dana D Ivey
(74) *Attorney, Agent, or Firm* — Harness, Dickey & Pierce, P.L.C.

(57) ABSTRACT

A high-voltage auxiliary system for a vehicle includes a high-voltage battery, a temperature raising device, a high-voltage auxiliary machine, and an electronic control device. The temperature raising device is connected to the high-voltage battery via an electric circuit and raises the temperature of the high-voltage battery by utilizing fluctuations in voltage and current. The high-voltage auxiliary machine is electrically connected to the electric circuit and is driven by power supplied from the high-voltage battery. The electronic control device suppresses the operating state of the high-voltage auxiliary machine so that a fluctuation in voltage and current due to the operation of the temperature raising device and the operation of the high-voltage auxiliary machine is less than an allowable value of the high-voltage auxiliary machine.

7 Claims, 11 Drawing Sheets

(51) Int. Cl.

| | |
|---|---|
| ***B60L 58/27*** | (2019.01) |
| ***H01M 10/613*** | (2014.01) |
| ***H01M 10/615*** | (2014.01) |
| ***H01M 10/637*** | (2014.01) |
| ***H01M 10/6569*** | (2014.01) |
| *B60L 1/02* | (2006.01) |
| *B60L 3/00* | (2019.01) |
| *B60L 58/25* | (2019.01) |
| *B60L 58/26* | (2019.01) |
| *H01M 10/633* | (2014.01) |
| *H01M 10/6571* | (2014.01) |
| *H02J 7/00* | (2006.01) |
| *H02M 7/48* | (2007.01) |

(52) U.S. Cl.

CPC ....... *H01M 10/615* (2015.04); *H01M 10/637* (2015.04); *H01M 10/6569* (2015.04); *B60L 1/00* (2013.01); *B60L 1/02* (2013.01); *B60L 3/0046* (2013.01); *B60L 58/25* (2019.02); *B60L 58/26* (2019.02); *B60L 2240/36* (2013.01); *B60L 2240/545* (2013.01); *H01M 10/633* (2015.04); *H01M 10/6571* (2015.04); *H01M 2220/20* (2013.01); *H02J 7/00* (2013.01); *H02M 7/48* (2013.01)

(58) Field of Classification Search

CPC ........... H01M 2220/20; H01M 10/633; H01M 10/6571; B60L 1/003; B60L 58/27; B60L 2240/36; B60L 1/02; B60L 58/26; B60L 2240/545; B60L 3/0046; B60L 1/00; B60L 58/25; H02J 7/00; H02M 7/48

USPC ............................................................ 701/36

See application file for complete search history.

(56) References Cited

U.S. PATENT DOCUMENTS

| | | | | |
|---|---|---|---|---|
| 2012/0139338 | A1* | 6/2012 | Kim | B60L 1/00 307/10.1 |
| 2012/0200263 | A1 | 8/2012 | Masuda | |
| 2015/0239474 | A1 | 8/2015 | Nakamura | |
| 2017/0028981 | A1* | 2/2017 | Ogawa | B60K 6/445 |
| 2019/0193589 | A1* | 6/2019 | Toriumi | H01M 8/04567 |
| 2019/0273296 | A1* | 9/2019 | Porras | H01M 10/635 |
| 2020/0014240 | A1* | 1/2020 | Boesch | B60R 16/033 |

FOREIGN PATENT DOCUMENTS

| | | | | |
|---|---|---|---|---|
| JP | 4081855 | B2 | | 4/2008 |
| JP | 4936017 | B2 | | 5/2012 |
| JP | 2013077452 | A | | 4/2013 |
| JP | 2015162933 | A | | 9/2015 |
| JP | 201846661 | A | | 3/2018 |
| JP | 2018046661 | A | * | 3/2018 |

* cited by examiner

HIGH-VOLTAGE AUXILIARY MACHINE
MAIN MACHINE
COMPRESSION SECTION
AUXILIARY MOTOR
AUXILIARY INV
AUXILIARY ECU
MAIN INV
MAIN ECU
HIGH-VOLTAGE BATTERY
BATTERY ECU
30
31
34
41
40
22
20
21
33
32
35
23
10
11

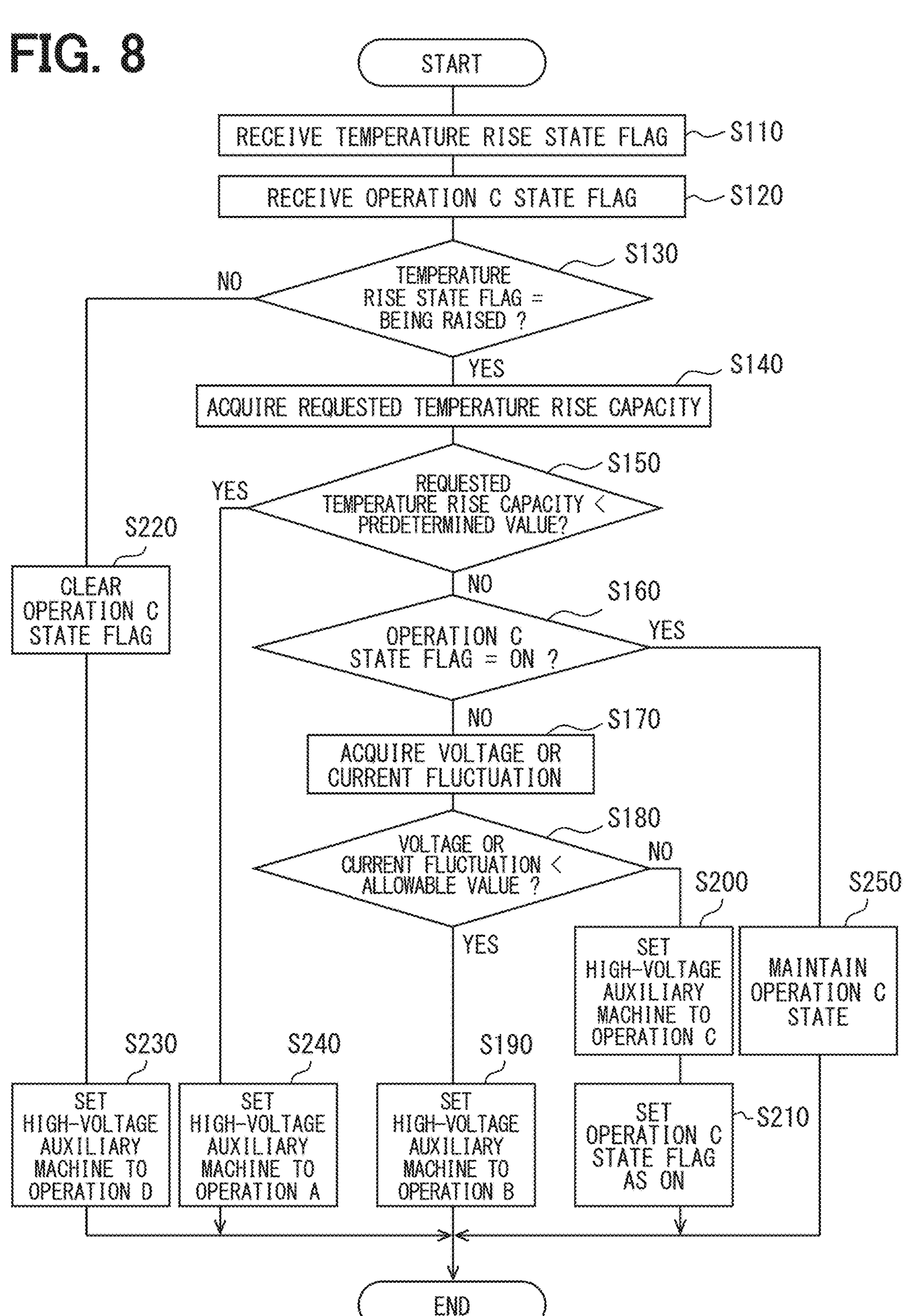
FIG. 8
START
RECEIVE TEMPERATURE RISE STATE FLAG
S110
RECEIVE OPERATION C STATE FLAG
S120
TEMPERATURE RISE STATE FLAG = BEING RAISED ?
S130
NO
YES
ACQUIRE REQUESTED TEMPERATURE RISE CAPACITY
S140
REQUESTED TEMPERATURE RISE CAPACITY < PREDETERMINED VALUE?
S150
YES
NO
OPERATION C STATE FLAG = ON ?
S160
YES
NO
ACQUIRE VOLTAGE OR CURRENT FLUCTUATION
S170
VOLTAGE OR CURRENT FLUCTUATION < ALLOWABLE VALUE ?
S180
NO
YES
S220
CLEAR OPERATION C STATE FLAG
S200
SET HIGH-VOLTAGE AUXILIARY MACHINE TO OPERATION C
S250
MAINTAIN OPERATION C STATE
S230
SET HIGH-VOLTAGE AUXILIARY MACHINE TO OPERATION D
S240
SET HIGH-VOLTAGE AUXILIARY MACHINE TO OPERATION A
S190
SET HIGH-VOLTAGE AUXILIARY MACHINE TO OPERATION B
SET OPERATION C STATE FLAG AS ON
S210
END TEMPERATURE CONTROL ECU
HIGH-VOLTAGE BATTERY
BATTERY ECU
HIGH-VOLTAGE AUXILIARY MACHINE
MAIN MACHINE
COMPRESSION SECTION
AUXILIARY MOTOR
AUXILIARY INV
AUXILIARY ECU
MAIN INV
MAIN ECU
10
11
20
21
22
23
30
31
32
33
331
332
34
35
36
40
41
50
51
52
53
54
55
56
57
58
59
60

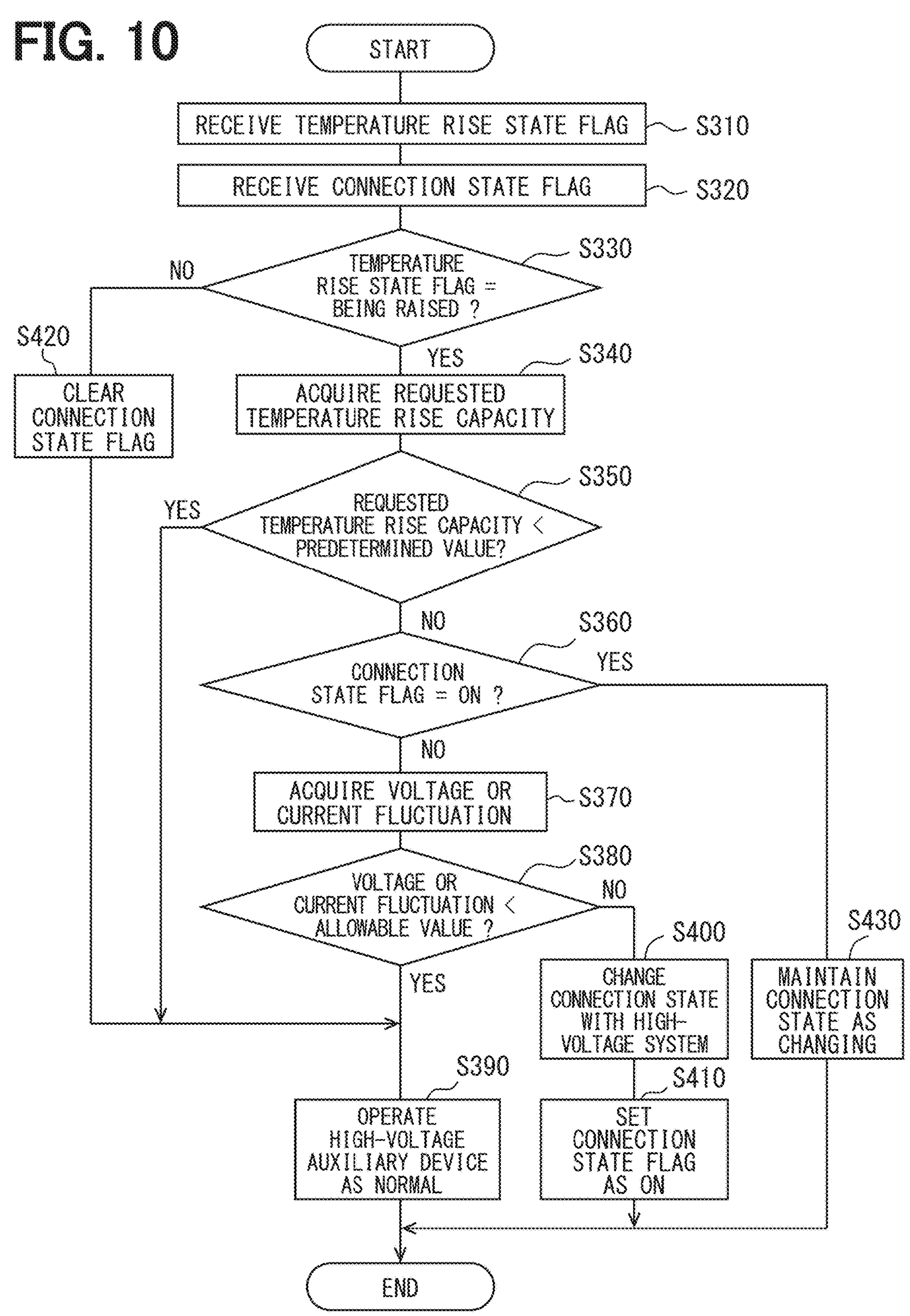
FIG. 10
START
RECEIVE TEMPERATURE RISE STATE FLAG
S310
RECEIVE CONNECTION STATE FLAG
S320
TEMPERATURE RISE STATE FLAG = BEING RAISED ?
S330
NO
YES
S420
CLEAR CONNECTION STATE FLAG
ACQUIRE REQUESTED TEMPERATURE RISE CAPACITY
S340
REQUESTED TEMPERATURE RISE CAPACITY < PREDETERMINED VALUE?
S350
YES
NO
CONNECTION STATE FLAG = ON ?
S360
YES
NO
ACQUIRE VOLTAGE OR CURRENT FLUCTUATION
S370
VOLTAGE OR CURRENT FLUCTUATION < ALLOWABLE VALUE ?
S380
NO
YES
S400
CHANGE CONNECTION STATE WITH HIGH-VOLTAGE SYSTEM
S430
MAINTAIN CONNECTION STATE AS CHANGING
S390
OPERATE HIGH-VOLTAGE AUXILIARY DEVICE AS NORMAL
S410
SET CONNECTION STATE FLAG AS ON
END 60
TEMPERATURE CONTROL ECU
59
57
HIGH-VOLTAGE BATTERY
10
58
BATTERY ECU
11
40
30
HIGH-VOLTAGE AUXILIARY MACHINE
37
34
41
40
22
20
MAIN MACHINE
21
50, 52
HIGH-VOLTAGE WATER HEATER
DRIVE CIRCUIT
AUXILIARY ECU
MAIN INV
MAIN ECU
39
38
35
41
40
23

HIGH-VOLTAGE AUXILIARY SYSTEM AND ELECTRONIC CONTROL DEVICE

CROSS REFERENCE TO RELATED APPLICATIONS

The present application is a continuation application of International Patent Application No. PCT/JP2023/018138 filed on May 15, 2023, which designated the U.S. and claims the benefit of priority from Japanese Patent Application No. 2022-093840 filed on Jun. 9, 2022. The entire disclosures of all of the above applications are incorporated herein by reference.

TECHNICAL FIELD

The present disclosure relates to a high-voltage auxiliary system for a vehicle.

BACKGROUND

A high-voltage auxiliary system is mounted on vehicles such as electric vehicles, hybrid vehicles, and plug-in hybrid vehicles. The high-voltage auxiliary system includes a high-voltage auxiliary machine and a high-voltage battery. In the system, the high-voltage battery is heated, when the outside air temperature is low, by using a temperature raising device connected to the high-voltage battery.

SUMMARY

According to an aspect of the present disclosure, a high-voltage auxiliary system for a vehicle includes: a high-voltage battery; a temperature raising device connected to the high-voltage battery via an electric circuit to raise a temperature of the high-voltage battery by utilizing fluctuations in voltage and current; a high-voltage auxiliary machine electrically connected to the electric circuit and driven by power supplied from the high-voltage battery; and an electronic control device configured to suppress operating state of the high-voltage auxiliary machine so that a fluctuation in voltage and current due to operation of the temperature raising device and operation of the high-voltage auxiliary machine is smaller than an allowable value of the high-voltage auxiliary machine.

BRIEF DESCRIPTION OF DRAWING

FIG. 8 is a flowchart showing an example of control process executed by an auxiliary ECU in the high-voltage auxiliary system of the second embodiment.

FIG. 10 is a flowchart showing an example of control process executed by an auxiliary ECU in the high-voltage auxiliary system according to the third embodiment.

DETAILED DESCRIPTION

Figure 1:
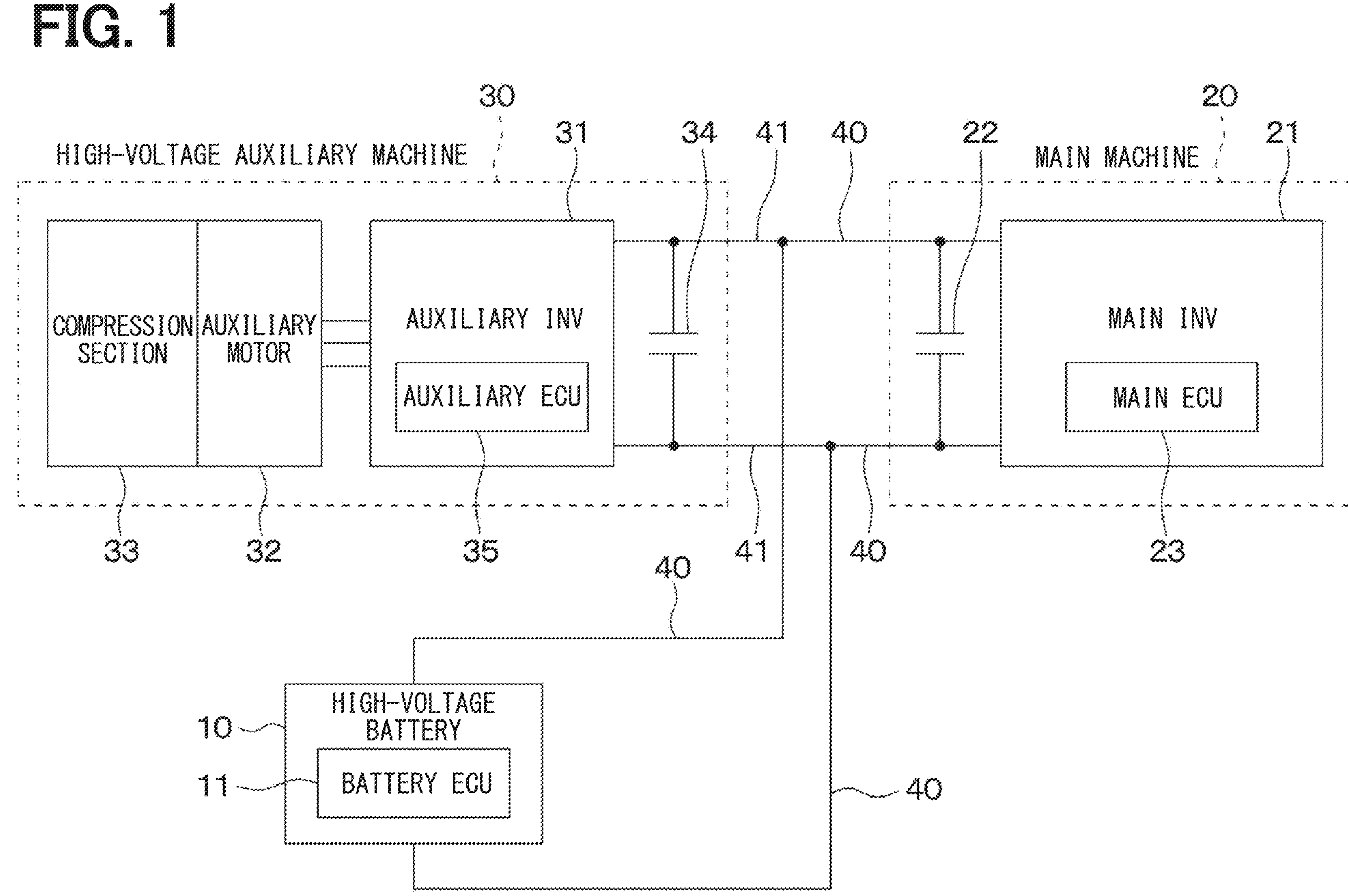
FIG. 1 is a schematic configuration diagram of a high-voltage auxiliary system according to a first embodiment.

A high-voltage auxiliary system is mounted on a vehicle such as electric vehicle, hybrid vehicle, and plug-in hybrid vehicle. The high-voltage auxiliary system includes a high-voltage auxiliary machine and a high-voltage battery. In the high-voltage auxiliary system, the high-voltage battery is heated when the outside air temperature is low, by using a temperature raising device connected to the high-voltage battery. Specifically, the temperature raising device is a resonant circuit in which an inductor, a capacitor, and an AC power supply are connected in series to the high-voltage battery. The temperature raising device uses an AC power source to generate an AC voltage at the resonant frequency of the resonant circuit, and causes the resulting ripple current to flow through cells in the high-voltage battery, thereby raising the temperature of the high-voltage battery.

However, in the system, if a ripple is generated in the temperature raising device, the ripple will also interfere with other high-voltage auxiliary machine electrically connected to the electric circuit connecting the temperature raising device and the high-voltage battery. This ripple interference can cause component failure or shortened lifespan of high-voltage auxiliary machine.

The present disclosure provides a high-voltage auxiliary system and an electronic control device capable of restricting component failure and shortened lifespan of the high-voltage auxiliary machine.

According to one aspect of the present disclosure, a high-voltage auxiliary system mounted on a vehicle includes: a high-voltage battery; a temperature raising device connected to the high-voltage battery via an electric circuit to raise the temperature of the high-voltage battery by utilizing fluctuations in voltage and current; a high-voltage auxiliary machine electrically connected to the electric circuit and driven by power supplied from the high-voltage battery; and an electronic control device that performs at least one of suppressing the operating state of the high-voltage auxiliary machine and cutting off the electrical connection between the high-voltage auxiliary machine and the electric circuit so that a fluctuation in voltage and current due to the operation of the temperature raising device and the operation of the high-voltage auxiliary machine is within an allowable range of the high-voltage auxiliary machine.

According to this, when the temperature raising device heats up the high-voltage voltage battery, fluctuations in voltage and current (hereinafter sometimes referred to as "ripple") may enter the high-voltage auxiliary machine electrically connected to the electric circuit. Ripples are also generated by the operation of high-voltage auxiliary machine. At that time, the electronic control device conducts at least one of suppressing the operating state of the high-voltage auxiliary machine and cutting off the electrical connection between the high-voltage auxiliary machine and the electric circuit so that the ripple caused by the operation of the temperature raising device and the operation of the high-voltage auxiliary machine is less than the allowable value for the high-voltage auxiliary machine. As a result, the ripple entering the high-voltage auxiliary machine is kept below the allowable value, thereby restricting component failure and shortened life of the high-voltage auxiliary machine.

Another aspect of the present disclosure relates to an electronic control device for use in a high-voltage auxiliary system. The high-voltage auxiliary system includes a high-voltage battery, a temperature raising device connected to the high-voltage battery via an electric circuit and using fluctuations in voltage and current to raise the temperature of the high-voltage battery, and a high-voltage auxiliary machine electrically connected to the electric circuit and driven by power supplied from the high-voltage battery. The electronic control device is configured to perform at least one of suppressing the operating state of the high-voltage auxiliary machine and cutting off the electrical connection between the high-voltage auxiliary machine and the electric circuit so that a fluctuation in voltage and current due to operation of the temperature raising device and operation of the high-voltage auxiliary machine is below the allowable value for the high-voltage auxiliary machine.

According to this aspect of the present disclosure, it is possible to achieve the same effects as the one aspect of the present disclosure. In the following description, an electronic control unit is referred to as an ECU.

Embodiments of the present disclosure will be described with reference to the drawings. Parts that are identical or equivalent to each other in the following embodiments are assigned the same reference numerals and will not be described.

First Embodiment

A first embodiment will be described with reference to the drawings. A high-voltage auxiliary system of the present embodiment is mounted on an electric vehicle, a hybrid vehicle, a plug-in hybrid vehicle, or the like.

As shown in FIG. 1, the high-voltage auxiliary system includes a high-voltage battery 10, a main machine 20, and a high-voltage auxiliary machine 30. Although FIG. 1 illustrates one high-voltage auxiliary machine 30, the high-voltage auxiliary system may include plural high-voltage auxiliary machines 30.

The high-voltage battery 10 is a chargeable and dischargeable secondary battery, and is formed, for example, of a lithium-ion battery. Generally, the high-voltage battery 10 has a performance degradation and deterioration at low temperatures, but this can be improved by using the battery at an elevated temperature. The high-voltage battery 10, the main machine 20, and the high-voltage auxiliary machine 30 are connected by electric circuits 40, 41. The electric circuit 40, 41 is constituted by high-voltage cable. The high-voltage battery 10 supplies power to the main machine 20 via the electric circuit 40, and also supplies power to the high-voltage auxiliary machine 30 via the electric circuit 41 connected in parallel to the electric circuit 40. In the following description, the electric circuit 40 that connects the high-voltage battery 10 and the main INV 21 is referred to as the "main-side electric circuit 40." Further, the electric circuit 41 that connects the main-side electric circuit 40 and the high-voltage auxiliary machine 30 is referred to as the "auxiliary-side electric circuit 41."

The high-voltage battery 10 is equipped with a battery ECU 11. The battery ECU 11 has a microcomputer including a processor and memory such as a ROM and a RAM, and peripheral circuits thereof. The battery ECU 11 controls the charging and discharging of the high-voltage battery 10 and detects the temperature of the high-voltage battery 10 by the processor executing a program stored in the memory.

The main machine 20 has a main INV 21, a main-side smoothing capacitor 22, and a traction motor (not shown). Hereinafter, the inverter is abbreviated as "INV." The main INV 21 converts the direct current supplied from the high-voltage battery 10 into alternating current (specifically, three-phase alternating current), supplies power to the traction motor, and drives the traction motor. When the traction motor functions as a generator, the main INV 21 converts the AC current supplied from the traction motor (i.e., the generator) into DC current and charges the high-voltage battery 10. The main-side smoothing capacitor 22 smoothes the voltage supplied from the high-voltage battery 10 to the main INV 21.

Furthermore, the main INV 21 of this embodiment has a temperature raising function to raise the temperature of the high-voltage battery 10 by utilizing fluctuations in voltage and current. The main INV 21 of this embodiment is an example of a temperature raising device. A certain amount of inductance exists in the main-side electric circuit 40 that connects the main-side smoothing capacitor 22 and the high-voltage battery 10. Therefore, the main-side smoothing capacitor 22, the high-voltage battery 10, and the main-side electric circuit 40 that connects them together form a resonant circuit. Therefore, when the main INV 21 is operated at a predetermined resonant frequency, resonance occurs in the resonant circuit, and the ripple current generated thereby can raise the temperature of the high-voltage battery 10 through self-heating. In this embodiment, the temperature raising device is configured by the main INV 21, but is not limited thereto. The temperature raising device may be configured, for example, by an INV separate from the main INV 21 or a separate resonant circuit.

The main INV 21 is equipped with a main ECU 23. The main ECU 23 has a microcomputer including a processor and memory such as ROM and RAM, and its peripheral circuits. The main ECU 23 controls the operation of the main INV 21 by the processor executing a program stored in the memory.

The high-voltage auxiliary machine 30 is an in-vehicle electric device that is driven by power supplied from the high-voltage battery 10. The high-voltage auxiliary machine 30 of the present embodiment is, for example, an electric compressor including an auxiliary INV 31, an auxiliary motor 32, a compression section 33, an auxiliary-side smoothing capacitor 34, and the like. The auxiliary INV 31 is connected to the auxiliary-side electric circuit 41 which is connected in parallel to the main-side electric circuit 40. The auxiliary INV 31 converts the direct current supplied from the high-voltage battery 10 into an alternating current (specifically, a three-phase alternating current) and supplies power to the auxiliary motor 32 to drive the auxiliary motor 32. The auxiliary motor 32 drives the compression section 33 of the electric compressor. The auxiliary-side smoothing capacitor 34 smoothes the voltage supplied from the high-voltage battery 10 to the auxiliary INV 31.

The auxiliary INV 31 is equipped with an auxiliary ECU 35. The auxiliary ECU 35 has a microcomputer including a processor and memory such as ROM and RAM, and its peripheral circuits. The auxiliary ECU 35 controls the operation of the auxiliary INV 31 by the processor executing a program stored in the memory. The auxiliary ECU 35 of the present embodiment is an example of an electronic control device.

Figure 2:
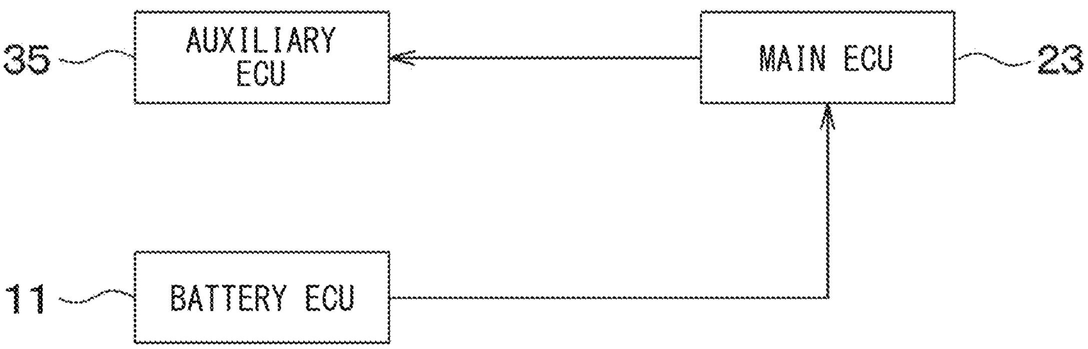
FIG. 2 is a conceptual diagram showing an example of communication between ECUs in the high-voltage auxiliary system according to the first embodiment.

As shown in FIG. 2, the battery ECU 11, the main ECU 23, and the auxiliary ECU 35 are connected to each other via an in-vehicle LAN (abbreviation of Local Area Network) using, for example, CAN (abbreviation of Controller Area Network) communication, or a wire harness. FIG. 2 is a schematic diagram showing an example of communication between the battery ECU 11, the main ECU 23, and the auxiliary ECU 35.

The battery ECU 11 detects the temperature of the high-voltage battery 10 and notifies the main ECU 23 of the temperature information. The main ECU 23 calculates a requested temperature rise capacity based on the temperature of the high-voltage battery 10 obtained from the battery ECU 11. The main ECU 23 executes the temperature raising operation by the main INV 21 based on the requested temperature rise capacity, and notifies the auxiliary ECU 35 of information related to the requested temperature rise capacity. As described above, the temperature raising operation by the main INV 21 operates the main INV 21 at a predetermined resonant frequency, thereby causing voltage fluctuations and current fluctuations between the main-side smoothing capacitor 22 and the high-voltage battery 10, to raise the temperature of the high-voltage battery 10 by self-heating.

At that time, the voltage fluctuations and current fluctuations due to the temperature raising operation of the main INV 21 are also input to the auxiliary-side smoothing capacitor 34 of the high-voltage auxiliary machine 30 connected to the auxiliary-side electric circuit 41 in parallel to the main-side electric circuit 40. At the same time, when the high-voltage auxiliary machine 30 is operating, voltage fluctuations and current fluctuations caused by the operation of the auxiliary INV 31 are input to the auxiliary-side smoothing capacitor 34. If the voltage fluctuations and current fluctuations (i.e., ripples) input to the auxiliary-side smoothing capacitor 34 exceed the allowable range of the auxiliary-side smoothing capacitor 34, components of the high-voltage auxiliary machine 30 may fail or the lifespan will be shortened.

Therefore, the auxiliary ECU 35 determines the operating state of the high-voltage auxiliary machine 30 based on the requested temperature rise capacity obtained from the main ECU 23. In the first embodiment, the auxiliary ECU 35 suppresses the operating state of the high-voltage auxiliary machine 30 so that the fluctuations in voltage and current due to the operation of the main INV 21 and the auxiliary INV 31 are less than the allowable value of the auxiliary-side smoothing capacitor 34. The allowable value of the auxiliary-side smoothing capacitor 34 varies depending on the component specifications of the high-voltage auxiliary machine 30, and is set in advance through experiments or the like and stored in the memory of the auxiliary ECU 35. The suppressing the operating state of the high-voltage auxiliary machine 30 includes stopping the operation of the high-voltage auxiliary machine 30. As a result, the ripple input from the auxiliary INV 31 to the auxiliary-side smoothing capacitor 34 is reduced, and the ripple generated in the auxiliary-side smoothing capacitor 34 becomes less than the allowable value of the auxiliary-side smoothing capacitor 34. Therefore, component failure and shortening of the lifespan of the high-voltage auxiliary machine 30 can be restricted.

Here, for comparison with the high-voltage auxiliary system of the first embodiment, a high-voltage auxiliary system of a comparative example will be described.

In the high-voltage auxiliary system of the comparative example, the auxiliary ECU 35 of the high-voltage auxiliary machine 30 does not control the operating state of the high-voltage auxiliary machine 30 in response to the operation of the main INV 21 and the ripple generated in the auxiliary-side smoothing capacitor 34. Other than that, the high-voltage auxiliary system of the comparative example has the same configuration as the high-voltage auxiliary system of the first embodiment.

Figure 3:
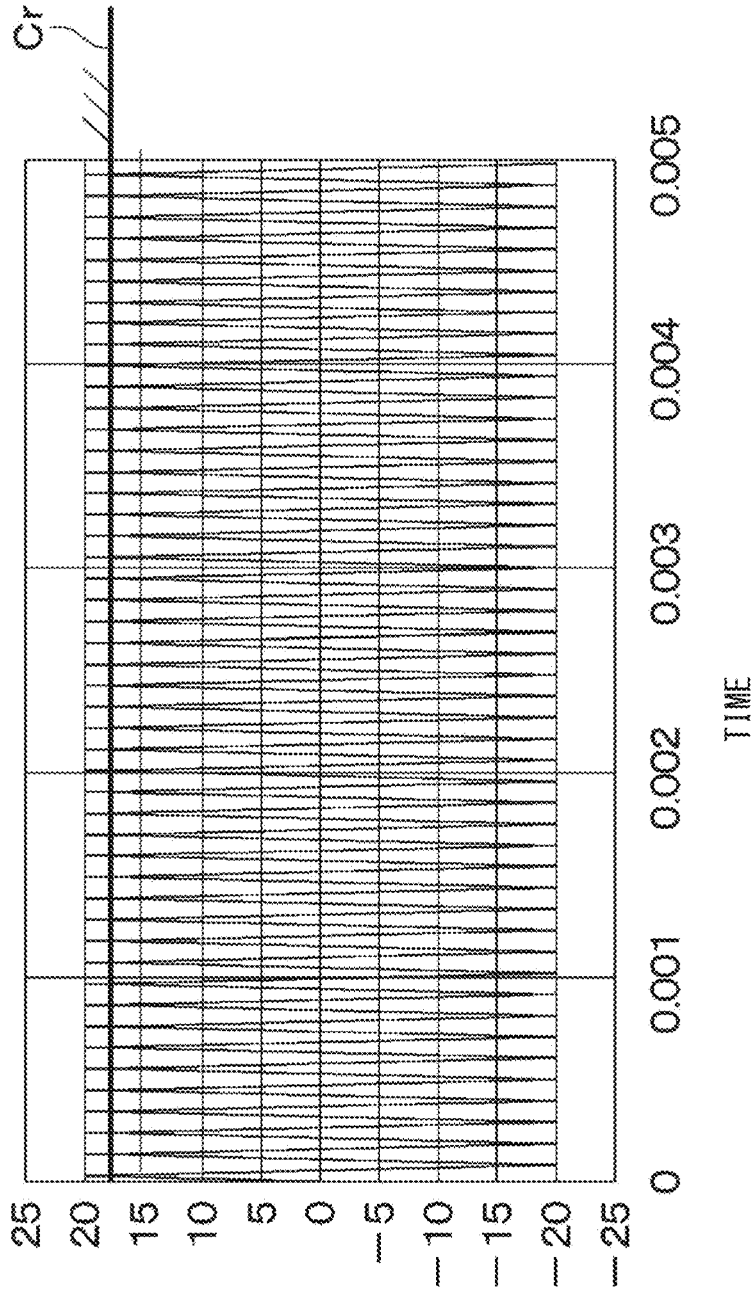
FIG. 3 is a graph showing an example of ripple occurring in an auxiliary-side smoothing capacitor in a high-voltage auxiliary system of a comparative example.

FIG. 3 is a graph representing an example of a ripple generated in the auxiliary-side smoothing capacitor 34 when the main INV 21 performs a temperature raising operation of the high-voltage battery 10 in the high-voltage auxiliary system of the comparative example. In the graph of FIG. 3, the horizontal axis represents time, and the vertical axis represents voltage or current. The solid line Cr indicates the allowable value of the auxiliary-side smoothing capacitor 34.

In the comparative example, the ripple generated in the auxiliary-side smoothing capacitor 34 is a superposition of the ripple caused by the temperature raising operation of the main INV 21 and the ripple caused by the operation of the auxiliary INV 31. In the comparative example, the auxiliary ECU 35 does not suppress the operating state of the high-voltage auxiliary machine 30. Therefore, the ripple occurring in the auxiliary-side smoothing capacitor 34 is larger than the allowable value. In the comparative example, the ripple is shown large as an absolute value, but a calculated value or the like may be used as long as it is possible to compare with the allowable value.

Figure 4:
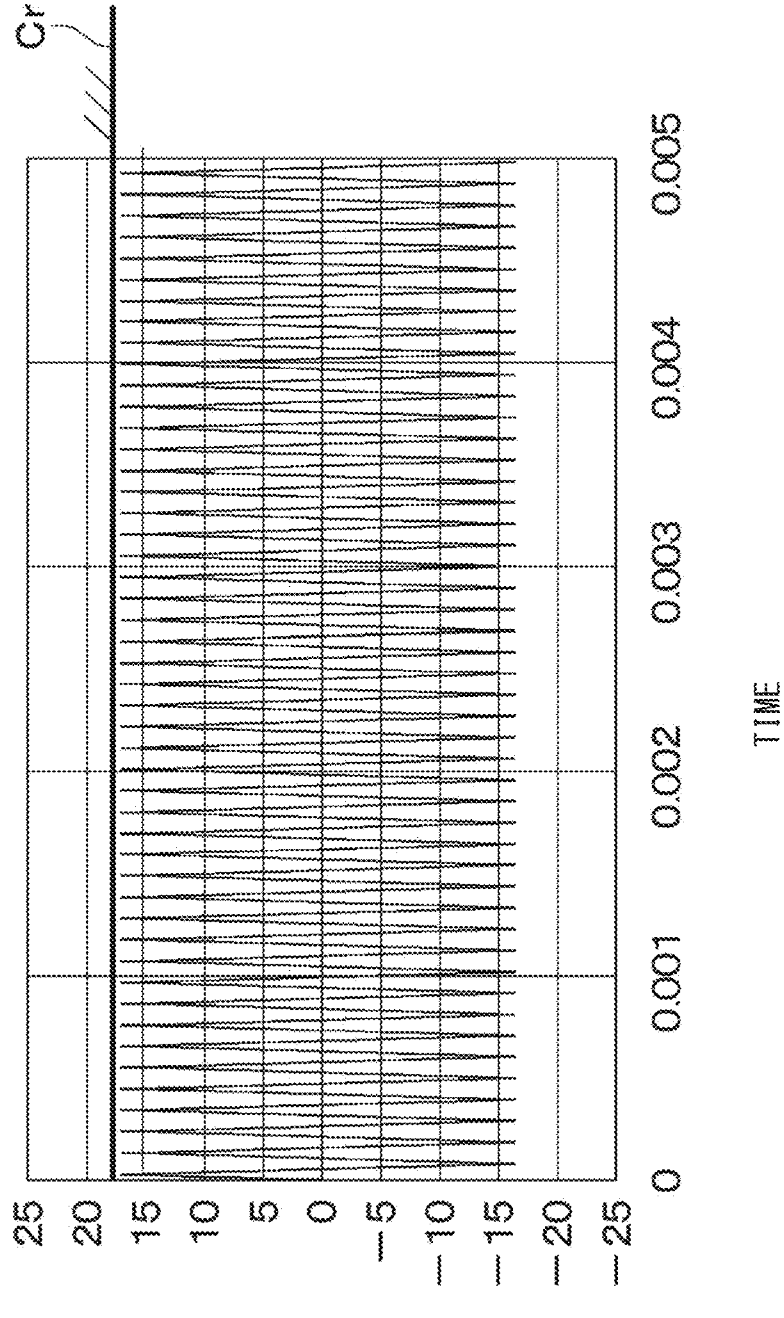
FIG. 4 is a graph showing an example of ripple occurring in an auxiliary-side smoothing capacitor in the high-voltage auxiliary system of the first embodiment.

In contrast, FIG. 4 is a graph showing an example of ripple generated in the auxiliary-side smoothing capacitor 34 when the main INV 21 performs a temperature raising operation of the high-voltage battery 10 in the high-voltage auxiliary system of the first embodiment. In the graph of FIG. 4, the horizontal axis indicates time, and the vertical axis indicates voltage or current. Moreover, the solid line Cr indicates the allowable value of the auxiliary-side smoothing capacitor 34.

In the first embodiment, the ripple generated in the auxiliary-side smoothing capacitor 34 is a superposition of the ripple caused by the temperature raising operation of the main INV 21 and the ripple caused by the operation of the auxiliary INV 31. However, in the first embodiment, the auxiliary ECU 35 can reduce the ripple generated in the auxiliary-side smoothing capacitor 34 by suppressing the operating state of the high-voltage auxiliary machine 30, and it can be seen that the ripple generated in the auxiliary-side smoothing capacitor 34 can be kept below the allowable value.

Next, an example of a control process executed by the auxiliary ECU 35 in the high-voltage auxiliary system of the first embodiment will be described with reference to a flowchart of FIG. 5.

Figure 5:
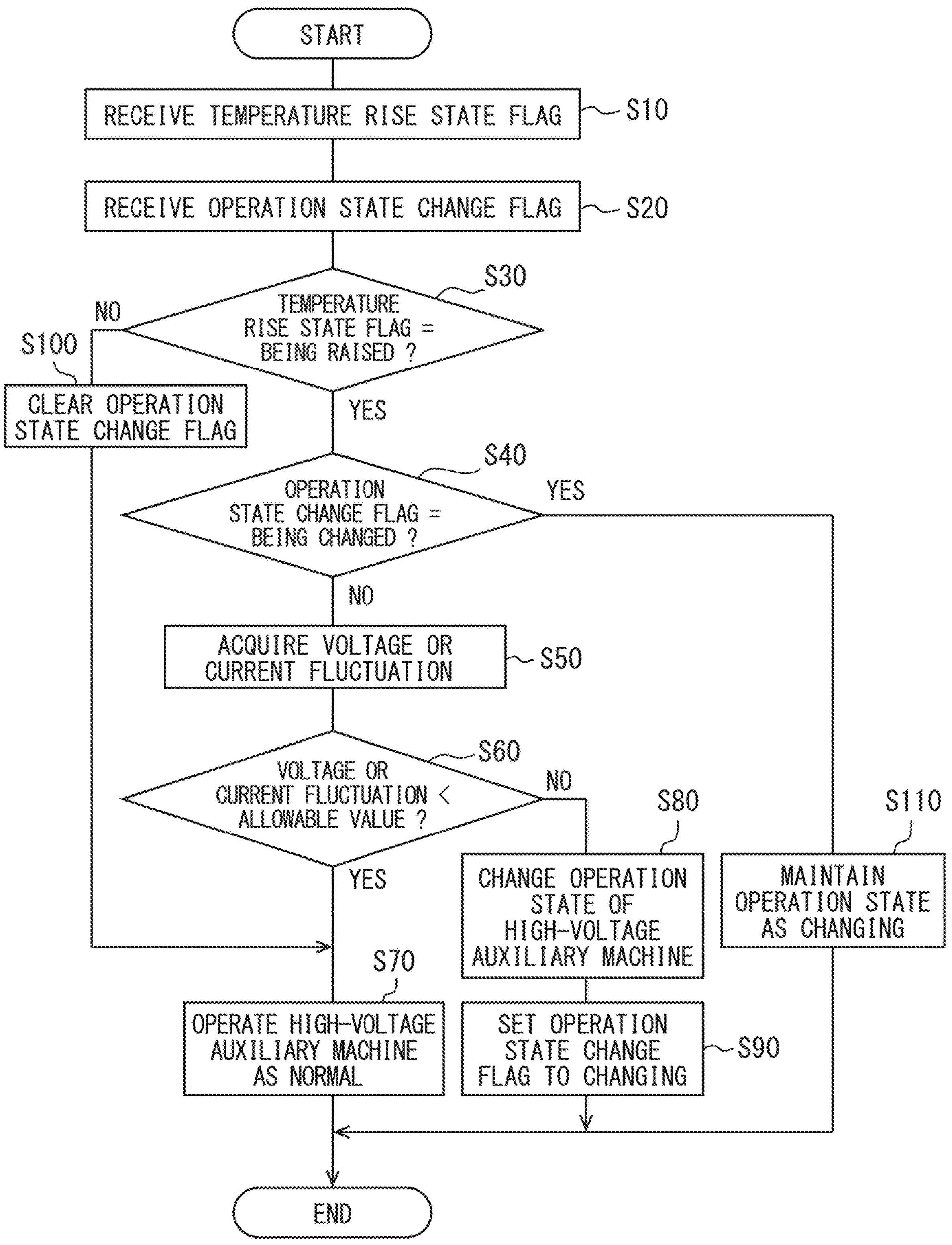
FIG. 5 is a flowchart showing an example of control process executed by an auxiliary ECU in the high-voltage auxiliary system of the first embodiment.

The control process shown in FIG. 5 is a part of a control flow that is repeatedly executed cyclically. Therefore, the control process shown in FIG. 5 is repeatedly executed periodically along with the overall control flow.

First, in step S10, the auxiliary ECU 35 receives the temperature rise state flag from the main ECU 23. The temperature rise state flag indicates whether or not the main INV 21 is under performing a temperature raising operation on the high-voltage battery 10 (i.e., "temperature rise in progress").

Next, in step S20, the auxiliary ECU 35 receives the operation state change flag. The operation state change flag indicates whether the operating state of the high-voltage auxiliary machine 30 is in a suppressed state (i.e., "changing") or in a normal operating state.

Next, in step S30, the auxiliary ECU 35 determines whether the temperature rise state flag received in step S10 is "being raised". If it is determined in step S30 that the temperature rise state flag is not "being raised", the process proceeds to step S100. In step S100, the auxiliary ECU 35 clears the setting of the operation state change flag, and the process proceeds to step S70. Note that clearing the setting of the operation state change flag means canceling the flag if the operation state change flag is "being changed." In step S70, the auxiliary ECU 35 operates the high-voltage auxiliary machine 30 in a normal operating state.

When it is determined in step S30 that the temperature rise state flag is "being raised", the process proceeds to step S40. In step S40, the auxiliary ECU 35 determines whether the operation state change flag received in step S20 is "being changed". If it is determined in step S40 that the operation state change flag is "being changed", that is, if it is determined that the operation of the high-voltage auxiliary machine 30 is suppressed, the process proceeds to step S110. In step S110, the auxiliary ECU 35 maintains the operation state change flag as "changing" and maintains the operation state of the high-voltage auxiliary machine 30 in the suppressed state.

When the temperature rise state flag is determined to be "being raised" in step S30 and the operation state change flag is determined to be not "being changed" in the next step S40, that is, if it is determined that the high-voltage auxiliary machine 30 is in a normal operating state, the process proceeds to step S50.

In step S50, the auxiliary ECU 35 acquires the voltage fluctuation or current fluctuation occurring in the auxiliary-side smoothing capacitor 34 from, for example, a voltage detection circuit or a current detection circuit of the auxiliary INV 31. Then, in step S60, the auxiliary ECU 35 determines whether the voltage fluctuation or current fluctuation acquired in step S50 is less than the allowable value of the auxiliary-side smoothing capacitor 34 or not. If it is determined that the voltage fluctuation or current fluctuation is less than the allowable value of the auxiliary-side smoothing capacitor 34, the process proceeds to step S70. In step S70, the auxiliary ECU 35 operates the high-voltage auxiliary machine 30 in a normal operating state.

When it is determined in step S60 that the voltage fluctuation or current fluctuation is not less than the allowable value of the auxiliary-side smoothing capacitor 34, that is, if it is determined that it is equal to or greater than the allowable value, the process proceeds to step S80. In step S80, the auxiliary ECU 35 changes the operation state of the high-voltage auxiliary machine 30 to a suppressed state. In addition, suppressing the operating state of the high-voltage auxiliary machine 30 includes stopping the operation of the high-voltage auxiliary machine 30 in addition to changing the operating condition of the high-voltage auxiliary machine 30 to reduce the output. As a result, the voltage fluctuation or current fluctuation occurring in the auxiliary-side smoothing capacitor 34 is reduced. Next, the process proceeds to step S90, where the auxiliary ECU 35 sets the operation state change flag to "changing."

Thereafter, the auxiliary ECU 35 temporarily ends the process, and periodically repeats the control processing described above together with the overall control flow.

The high-voltage auxiliary system of the first embodiment provides the following advantages.

(1) In the high-voltage auxiliary system of the first embodiment, when the main INV 21 functioning as a temperature raising device that raises the temperature of the high-voltage battery 10 by fluctuations in voltage and current, the auxiliary ECU 35 suppresses the operating state of the high-voltage auxiliary machine 30. At that time, the auxiliary ECU 35 suppresses the operating state of the high-voltage auxiliary machine 30 so that the ripple caused by the operation of the main INV 21 and the auxiliary INV 31 is less than the allowable value of the auxiliary-side smoothing capacitor 34. As a result, the ripple generated by the operation of the high-voltage auxiliary machine 30 is reduced, and the ripple entering the auxiliary-side smoothing capacitor 34 becomes less than the allowable value. Therefore, it becomes possible to use the high-voltage auxiliary machine 30 at a voltage lower than the allowable value of the auxiliary-side smoothing capacitor 34. Therefore, component failure and shortening of the lifespan of the high-voltage auxiliary machine 30 can be restricted.

(2) In the first embodiment, the suppression of the operating state of the high-voltage auxiliary machine 30 executed by the auxiliary ECU 35 includes stopping the operation of the high-voltage auxiliary machine 30. According to this, by stopping the operation of the high-voltage auxiliary machine 30, the ripple input to the auxiliary-side smoothing capacitor 34 can be reduced, and component failure and shortening of the lifespan of the high-voltage auxiliary machine 30 can be restricted. In addition, since the operation of raising the temperature of the high-voltage battery 10 by the main machine 20 is given priority, the temperature of the high-voltage battery 10 can be raised in a short period of time.

(3) The high-voltage auxiliary system of the first embodiment may include plural high-voltage auxiliary machines 30. In this case, the suppression of the operating state of the high-voltage auxiliary machine 30 executed by the auxiliary ECU 35 suppresses the operation of at least one or more high-voltage auxiliary machines 30. This makes it possible to restrict component failure and shortened life of the at least one or more high-voltage auxiliary machines 30 in which the ripple entering the smoothing capacitor exceeds the allowable value, among the multiple high-voltage auxiliary machines 30. In addition, since the raising of the temperature of the high-voltage battery 10 by the main machine 20 is given priority, the temperature of the high-voltage battery 10 can be raised in a short period of time.

Second Embodiment

A second embodiment will be described. The second embodiment is different from the first embodiment in that a part of the configuration of the high-voltage auxiliary system and a part of the control process by the auxiliary ECU 35 are changed, but the rest is the same as the first embodiment, so only the parts that differ from the first embodiment will be described.

Figure 6:
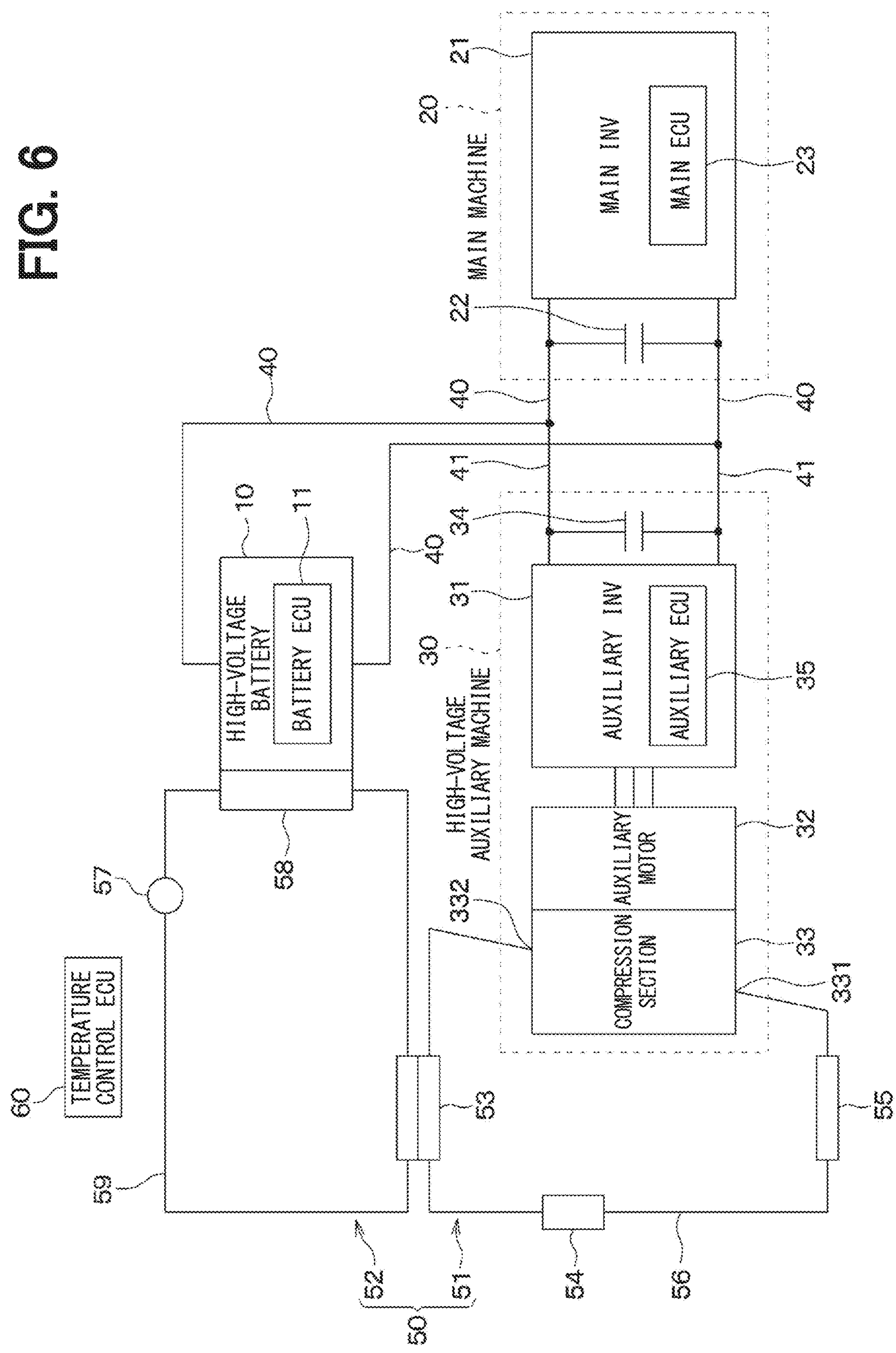
FIG. 6 is a schematic configuration diagram of a high-voltage auxiliary system according to a second embodiment.

As shown in FIG. 6, the high-voltage auxiliary system of the second embodiment includes a high-voltage battery 10, a main machine 20, a high-voltage auxiliary machine 30, and a battery temperature control device 50 that controls the temperature of the high-voltage battery 10. In other words, the high-voltage auxiliary system of the second embodiment is configured to raise the temperature of the high-voltage battery 10 by combining two means: to raise the temperature of the high-voltage battery 10, the temperature raising operation of the main INV 21; and the battery temperature control by the battery temperature control device 50.

The battery temperature control device 50 illustrated in FIG. 6 includes a refrigeration cycle device 51 having an electric compressor, and a coolant circuit 52 through which coolant circulates.

The refrigeration cycle device 51 is a vapor compression refrigeration cycle in which a compression section 33 of an electric compressor as an example of a high-voltage auxiliary machine 30, a water-refrigerant heat exchanger 53, an expansion valve 54, and an air-refrigerant heat exchanger 55 are connected by a refrigerant pipe 56. As the refrigerant circulating through the refrigeration cycle device 51, for example, an HFC refrigerant (such as R134a) or an HFO refrigerant (such as R1234yf) is used. In addition, a natural refrigerant (for example, carbon dioxide) may be used as the refrigerant.

The compression section 33 of the electric compressor may be of various types. The compression section 33 has a first opening 331 and a second opening 332 for drawing in and discharging the refrigerant. The compression section 33 is capable of compressing the gas-phase refrigerant drawn in from the first opening 331 and discharging it from the second opening 332.

The high-temperature, high-pressure gas-phase refrigerant discharged from the second opening 332 of the compression section 33 flows into the water-refrigerant heat exchanger 53. The water-refrigerant heat exchanger 53 exchanges heat between the refrigerant circulating in the refrigeration cycle device 51 and the coolant flowing in the coolant circuit 52. The refrigerant flowing through the water-refrigerant heat exchanger 53 dissipates heat to the coolant and is condensed. On the other hand, the coolant flowing through the water-refrigerant heat exchanger 53 absorbs heat from the refrigerant and is heated.

The expansion valve 54 may be a fixed throttle or a variable throttle. The liquid-phase refrigerant flowing out of the water-refrigerant heat exchanger 53 is decompressed and expanded when passing through the expansion valve 54, and flows into the air-refrigerant heat exchanger 55 in a gas-liquid two-phase state.

The air-refrigerant heat exchanger 55 functions as an evaporator that evaporates the refrigerant by heat exchange between the air and the refrigerant. That is, the refrigerant flowing through the air-refrigerant heat exchanger 55 absorbs heat from the air passing through the air-refrigerant heat exchanger 55 and evaporates, becoming a gas-phase refrigerant, which is then sucked into the first opening 331 of the compression section 33.

In addition to the above-described configuration, the refrigeration cycle device 51 may include various other configurations, such as a condenser that exchanges heat between the refrigerant and the outside air, and a liquid reservoir.

The coolant circuit 52 includes a coolant pump 57, a water-refrigerant heat exchanger 53, and a battery heat exchanger 58 connected by a coolant pipe 59. The coolant circulating through the coolant circuit 52 may be, for example, LLC (short for long life coolant).

The coolant pump 57 is an electric pump that circulates the coolant through the coolant circuit 52. The coolant circulating through the coolant circuit 52 absorbs heat from the refrigerant in the water-refrigerant heat exchanger 53 and is heated. The heated coolant dissipates heat to the high-voltage battery 10 when passing through the battery heat exchanger 58 provided in the high-voltage battery 10, thereby making it possible to raise the temperature of the high-voltage battery 10.

The battery temperature control device 50 includes a temperature control ECU 60. The temperature control ECU 60 has a microcomputer including a processor and memory such as ROM and RAM, and its peripheral circuits. The temperature control ECU 60 controls the operations of the refrigeration cycle device 51 and the coolant circuit 52, and detects the temperature of the coolant circulating through the coolant circuit 52, by the processor executing a program stored in the memory.

Figure 7:
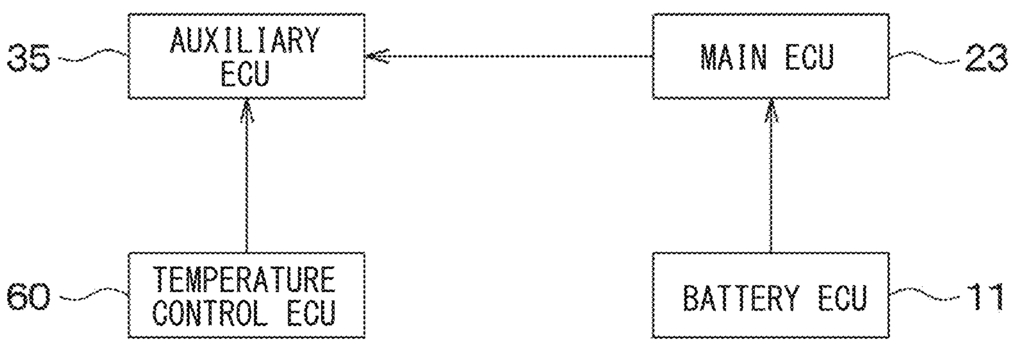
FIG. 7 is a conceptual diagram showing an example of communication between ECUs in the high-voltage auxiliary system of the second embodiment.

As shown in FIG. 7, the battery ECU 11, the main ECU 23, the auxiliary ECU 35, and the temperature control ECU 60 are connected to each other via an in-vehicle LAN using, for example, CAN communication, or a wire harness. FIG. 7 is a schematic diagram showing an example of communication between the battery ECU 11, the main ECU 23, the auxiliary ECU 35, and the temperature control ECU 60.

The battery ECU 11 detects the temperature of the high-voltage battery 10 and notifies the main ECU 23 of the temperature information. The main ECU 23 calculates the requested temperature rise capacity based on the temperature of the high-voltage battery 10 acquired from the battery ECU 11. Then, the main ECU 23 executes the temperature raising operation by the main INV 21 based on the requested temperature rise capacity, and notifies the auxiliary ECU 35 of information related to the requested temperature rise capacity. In parallel with this, the temperature control ECU 60 detects the temperature of the coolant circulating through the coolant circuit 52 and notifies the auxiliary ECU 35 of this information.

The auxiliary ECU 35 arbitrates and determines the mode in which the high-voltage auxiliary machine 30 operates based on information regarding the requested temperature rise capacity obtained from the main ECU 23 and information regarding the temperature of the coolant circulating through the coolant circuit 52 obtained from the temperature control ECU 60. Therefore, in the second embodiment, the auxiliary ECU 35 executes a control process to change the operating mode of the high-voltage auxiliary machine 30 depending on the temperature of the coolant, even if the requested temperature rise capacity obtained from the main ECU 23 is the same. The control process executed by the auxiliary ECU 35 will be described in detail below.

An example of a control process executed by the auxiliary ECU 35 in the high-voltage auxiliary system of the second embodiment will be described with reference to the flowchart of FIG. 8.

The control process shown in FIG. 8 is part of a control flow that is repeatedly executed cyclically. Therefore, the control process shown in FIG. 8 is repeatedly executed periodically together with the control flow.

First, in step S110, the auxiliary ECU 35 receives the temperature rise state flag from the main ECU 23. The temperature rise state flag indicates whether the main INV 21 is "raising the temperature" of the high-voltage battery 10 or not.

Next, in step S120, the auxiliary ECU 35 receives an operation C state flag. The operation C state flag indicates whether the high-voltage auxiliary machine 30 is in the operation C mode. In the operation C mode, the operating conditions of the high-voltage auxiliary machine 30 are changed (i.e., suppressed) to decrease the output so that the voltage fluctuations and current fluctuations (i.e., ripples) input to the auxiliary-side smoothing capacitor 34 are less than the allowable value of the auxiliary-side smoothing capacitor 34. In addition, the operation C mode is implemented to restrict the voltage fluctuations and current fluctuations (i.e., ripples) input to the auxiliary-side smoothing capacitor 34 from exceeding the allowable value of the auxiliary-side smoothing capacitor 34 under conditions where the requested temperature rise capacity of the main INV 21 is above a predetermined value and where the voltage fluctuations and current fluctuations (i.e., ripples) input to the auxiliary-side smoothing capacitor 34 may exceed the allowable value of the auxiliary-side smoothing capacitor 34.

Next, in step S130, the auxiliary ECU 35 determines whether the temperature rise state flag received in step S110 is "being raised". When it is determined that the temperature rise state flag is not "being raised", the process proceeds to step S220. In step S220, the auxiliary ECU 35 clears the operation C state flag, and the process proceeds to step S230. Note that clearing the operation C state flag means turning the operation C state flag OFF if the flag is ON. In step S230, the auxiliary ECU 35 sets the high-voltage auxiliary machine 30 to the operation D mode. In the operation D mode, there is no restriction on the operation of the high-voltage auxiliary machine 30.

When it is determined in step S130 that the temperature rise state flag is "being raised", the process proceeds to step S140. In step S140, the auxiliary ECU 35 acquires the requested temperature rise capacity from the main ECU 23. Then, in step S150, the auxiliary ECU 35 determines whether the requested temperature rise capacity is less than a predetermined value. This predetermined value is set to allow the high-voltage auxiliary machine 30 to operate by narrowing its output range even when the main INV 21 performs the temperature raising operation based on the requested temperature rise capacity, and is set in advance through experiments, etc., and stored in the auxiliary ECU 35. If it is determined in step S150 that the requested temperature rise capacity is less than the predetermined value, the process proceeds to step S240. In step S240, the auxiliary ECU 35 sets the high-voltage auxiliary machine 30 to the operation A mode. The operation A mode is an operation mode within an output range in which the high-voltage auxiliary machine 30 can operate under the condition that the requested temperature rise capacity is less than a predetermined value. This means that the output range is narrower in the operation A mode than in the operation D mode, which has no operation restriction on the high-voltage auxiliary machine 30.

If it is determined in step S150 that the requested temperature rise capacity is equal to or greater than the predetermined value, the process proceeds to step S160. In step S160, the auxiliary ECU 35 determines whether the operation C state flag received in step S120 is ON. If it is determined that the operation C state flag is ON, the process proceeds to step S250. In step S250, the auxiliary ECU 35 maintains the operation C mode.

If it is determined in step S160 that the operation C state flag is not ON (i.e., OFF), the process proceeds to step S170. In step S170, the auxiliary ECU 35 acquires the voltage fluctuation or current fluctuation occurring in the auxiliary-side smoothing capacitor 34 from, for example, a voltage detection circuit or a current detection circuit of the auxiliary INV 31.

Next, in step S180, the auxiliary ECU 35 determines whether the voltage fluctuation or current fluctuation acquired in step S170 is less than the allowable value of the auxiliary-side smoothing capacitor 34. If it is determined that the voltage fluctuation or current fluctuation is less than the allowable value of the auxiliary-side smoothing capacitor 34, the process proceeds to step S190. In step S190, the auxiliary ECU 35 sets the high-voltage auxiliary machine 30 to the operation B mode. In the operation B mode, the requested temperature rise capacity is above a predetermined value, but the voltage fluctuations or current fluctuations occurring in the auxiliary-side smoothing capacitor 34 do not exceed the allowable value, so that the operation of the high-voltage auxiliary machine 30 is maintained without changing the operating state.

If it is determined in step S180 that the voltage fluctuation or current fluctuation is not less than the allowable value of the auxiliary-side smoothing capacitor 34, that is, if it is determined that it is equal to or greater than the allowable value, the process proceeds to step S200. In step S200, the auxiliary ECU 35 sets the high-voltage auxiliary machine 30 to the operation C mode. Thereafter, the process proceeds to step S210, where the auxiliary ECU 35 sets the operation C state flag to ON.

Thereafter, the auxiliary ECU 35 temporarily ends the processing, and periodically repeats the control processing described above together with the overall control flow.

The high-voltage auxiliary system of the second embodiment provides the following advantages.

(1) The high-voltage auxiliary system of the second embodiment includes the battery temperature control device 50 driven by the operation of the high-voltage auxiliary machine 30 to control the temperature of the high-voltage battery 10. The high-voltage battery 10 is heated by both the operation of the main INV 21 as a temperature raising device and the temperature regulation by the battery temperature control device 50. This makes it possible to restrict component failure and shortening of the lifespan of the high-voltage auxiliary machine 30, while raising the temperature of the high-voltage battery 10 using both the battery temperature control device 50 and the main INV 21, which are driven by the operation of the high-voltage auxiliary machine 30. Therefore, even when the outside air temperature is low, the temperature of the high-voltage battery 10 can be increased efficiently in a short period of time.

In detail, as explained with reference to FIGS. 6 to 8, when the high-voltage auxiliary machine 30 is operating, the battery temperature control device 50 is also operating, so changing the operating mode of the high-voltage auxiliary machine 30 is equivalent to performing the battery temperature control. In other words, the high-voltage auxiliary system of the second embodiment has two functions for heating the high-voltage battery 10 by the main INV 21 and the battery temperature control by the battery temperature control device 50. Thus, efficient operation is achieved by coordinating and utilizing these functions.

(2) The auxiliary ECU 35 suppresses the operating state of the high-voltage auxiliary machine 30 under conditions where the requested heating capacity obtained from the main ECU 23 is equal to or greater than a predetermined value and the fluctuations in voltage and current due to the temperature raising operation of the main INV 21 and the operation of the high-voltage auxiliary machine 30 may exceed the allowable value of the high-voltage auxiliary machine 30. At that time, the auxiliary ECU 35 suppresses the operating state of the high-voltage auxiliary machine 30 so as to restrict the fluctuations in voltage and current due to the temperature raising operation of the main INV 21 and the operation of the high-voltage auxiliary machine 30 from exceeding the allowable value of the high-voltage auxiliary machine 30. According to this, when the requested temperature raise capacity is large, the performance of the high-voltage battery 10 is degraded due to the low outside air temperature. At this time, the auxiliary ECU 35 suppresses the operating state of the high-voltage auxiliary machine 30 so as to restrict the ripple occurring in the auxiliary-side smoothing capacitor 34 from exceeding the allowable value under conditions in which this could occur. This restricts component failure and shortened lifespan of the high-voltage auxiliary machine 30, while prioritizing the heating of the high-voltage battery 10 by the temperature raising device, thereby heating the high-voltage battery 10 in a short period of time and improving the performance of the entire high-voltage auxiliary system in a short period of time.

Third Embodiment

A third embodiment will be described. The third embodiment is different from the first or second embodiment in that a part of the configuration of the high-voltage auxiliary system and a part of the control processing of the auxiliary ECU 35 are changed, but the rest is similar to the first or second embodiment, so only the parts that are different from the first e or second embodiment will be described.

Figure 9:
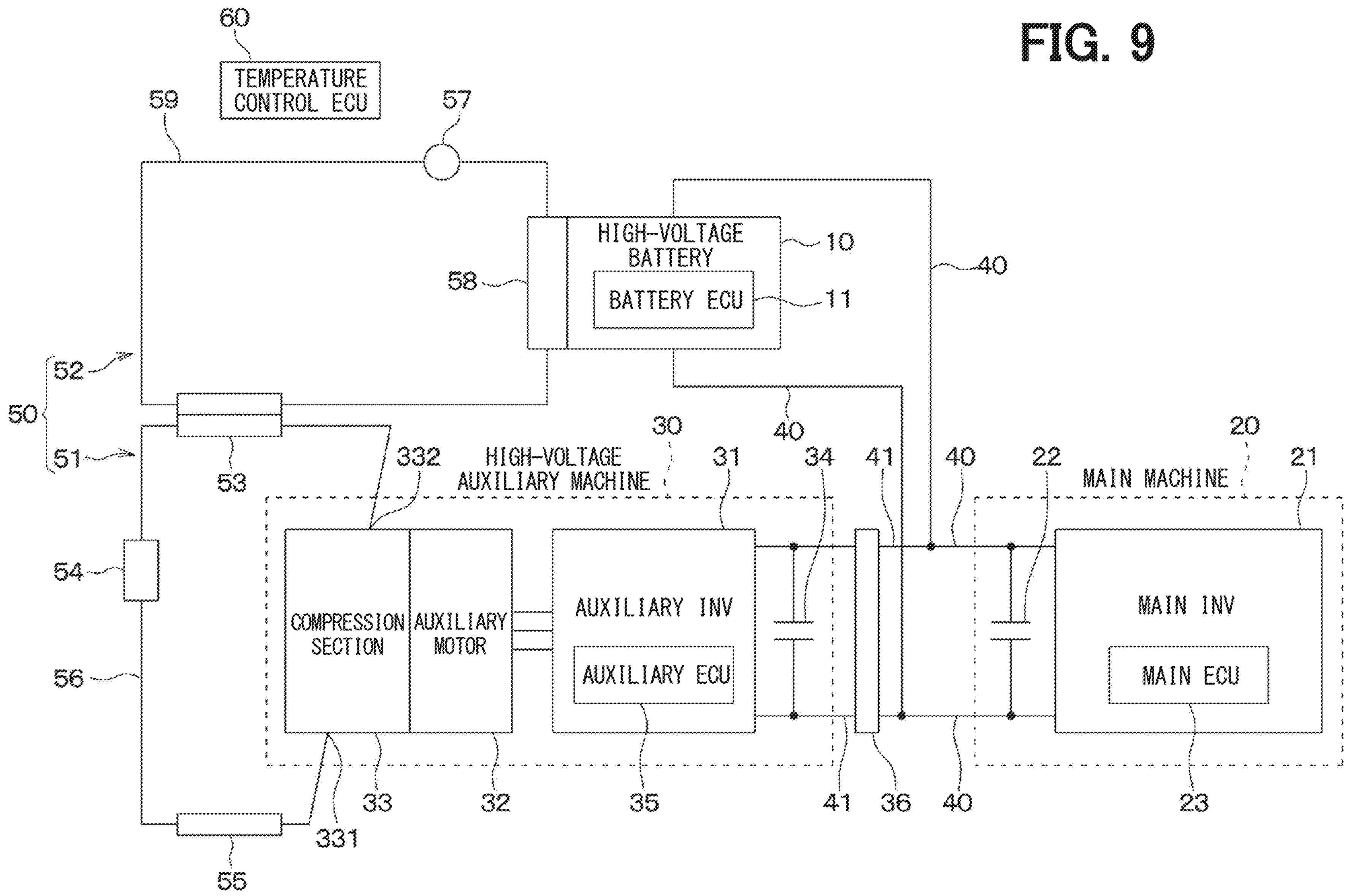
FIG. 9 is a schematic configuration diagram of a high-voltage auxiliary system according to a third embodiment.

As shown in FIG. 9, the high-voltage auxiliary system of the third embodiment is different from the system in the second embodiment, and includes a connection mechanism 36 provided midway in the auxiliary-side electric circuit 41. The connection mechanism 36 is a component capable of changing the electrical connection between the main-side electric circuit 40 and the high-voltage auxiliary machine 30, and is constituted by, for example, a semiconductor switch or a relay. Specifically, by opening the connection mechanism 36, the electrical connection between the main-side electric circuit 40 and the high-voltage auxiliary machine 30 is interrupted, that is, the electrical connection is cut off. On the other hand, by closing the connection mechanism 36, the electrical connection between the main-side electric circuit 40 and the high-voltage auxiliary machine 30 is brought into a connected state, that is, the electrical connection is brought into a continuous state.

An example of control process executed by the auxiliary ECU 35 in the high-voltage auxiliary system of the third embodiment will be described with reference to the flowchart of FIG. 10.

The control process shown in FIG. 10 is a part of a control flow that is repeatedly executed cyclically. Therefore, the control process shown in FIG. 10 is repeatedly executed periodically along with the overall control flow.

First, in step S310, the auxiliary ECU 35 receives the temperature rise state flag from the main ECU 23. The temperature rise state flag indicates whether the main INV 21 is "heating up" the high-voltage battery 10 or not.

Next, in step S320, the auxiliary ECU 35 receives a connection state flag. The connection state flag indicates whether the electrical connection between the main-side electric circuit 40 and the high-voltage auxiliary machine 30 is in a "disconnected" or "connected" state by the connection mechanism 36. In this embodiment, the connection status flag being ON indicates a state in which the electrical connection between the main-side electric circuit 40 and the high-voltage auxiliary machine 30 is "disconnected" by the connection mechanism 36, i.e., the connection mechanism 36 is open. The OFF state of the connection state flag indicates that the electrical connection is "connected" by the connection mechanism 36, that is, that the connection mechanism 36 is closed.

Next, in step S330, the auxiliary ECU 35 determines whether the temperature rise state flag received in step S310 is "being raised". If it is determined that the temperature rise state flag is not "being raised", the process proceeds to step S420. In step S420, the auxiliary ECU 35 clears the connection state flag, and the process proceeds to step S390. Note that clearing the connection state flag means turning the connection state flag OFF if it is ON. In step S390, the auxiliary ECU 35 closes the connection mechanism 36 to electrically connect the main-side electric circuit 40 and the high-voltage auxiliary machine 30, and operates the high-voltage auxiliary machine 30 in the normal operating state.

If it is determined in step S330 that the temperature rise state flag is "being raised", the process proceeds to step S340.

In step S340, the auxiliary ECU 35 acquires the requested temperature rise capacity from the main ECU 23. Then, in step S350, the auxiliary ECU 35 determines whether the requested temperature rise capacity is less than a predetermined value. If it is determined in step S350 that the requested temperature rise capacity is less than the predetermined value, the process proceeds to step S390. In step S390, the auxiliary ECU 35 closes the connection mechanism 36 to electrically connect the main-side electric circuit 40 and the high-voltage auxiliary machine 30, and operates the high-voltage auxiliary machine 30 in the normal operating state.

If it is determined in step S350 that the requested temperature rise capacity is equal to or greater than the predetermined value, the process proceeds to step S360. In step S360, the auxiliary ECU 35 determines whether the connection state flag received in step S320 is ON. If it is determined that the connection state flag is ON, the process proceeds to step S430. In step S430, the auxiliary ECU 35 maintains the state in which the connection state flag is ON, that is, the state in which the electrical connection is interrupted.

If it is determined in step S360 that the connection state flag is not ON, that is, if it is determined that the connection state flag is OFF, the process proceeds to step S370. In step S370, the auxiliary ECU 35 acquires the voltage fluctuation or current fluctuation occurring in the auxiliary-side smoothing capacitor 34 from, for example, a voltage detection circuit or a current detection circuit of the auxiliary INV 31.

Next, in step S380, the auxiliary ECU 35 determines whether the voltage fluctuation or current fluctuation acquired in step S370 is less than the allowable value of the auxiliary-side smoothing capacitor 34. If it is determined that the voltage fluctuation or current fluctuation is less than the allowable value of the auxiliary-side smoothing capacitor 34, the process proceeds to step S390. In step S390, the auxiliary ECU 35 operates the high-voltage auxiliary machine 30 in the normal operating state.

If it is determined in step S380 that the voltage fluctuation or current fluctuation is not less than the allowable value of the auxiliary-side smoothing capacitor 34, that is, if it is determined that it is equal to or greater than the allowable value, the process proceeds to step S400. In step S400, the auxiliary ECU 35 opens the connection mechanism 36, and cuts off the electrical connection between the main-side electric circuit 40 and the high-voltage auxiliary machine 30. Thereafter, the process proceeds to step S410, where the auxiliary ECU 35 sets the connection state flag to ON.

Thereafter, the auxiliary ECU 35 temporarily ends the processing, and periodically repeats the control processing described above together with the overall control flow.

The high-voltage auxiliary system of the third embodiment provides the following advantages.

(1) The high-voltage auxiliary system of the third embodiment includes the connection mechanism 36 provided midway in the auxiliary-side electric circuit 41. Then, the auxiliary ECU 35 executes control to cut off the electrical connection between the main-side electric circuit 40 and the high-voltage auxiliary machine 30 by opening the connection mechanism 36 so that the ripple caused by the temperature raising operation of the main INV 21 and the operation of the high-voltage auxiliary is less than the allowable value of the auxiliary-side smoothing capacitor 34. This restricts ripples from entering the auxiliary-side smoothing capacitor 34 from the main-side electric circuit 40. Therefore, component failure and shortening of the lifespan of the high-voltage auxiliary machine 30 can be restricted.

(2) In the high-voltage auxiliary system of the third embodiment, the auxiliary ECU 35 executes control to cut off the electrical connection between the main-side electric circuit 40 and the high-voltage auxiliary machine 30 under conditions in which fluctuations in voltage and current due to the temperature raising operation of the main INV 21 may exceed the tolerance of the auxiliary-side smoothing capacitor 34. At that time, the auxiliary ECU 35 executes control to cut off the electrical connection between the main-side electric circuit 40 and the high-voltage auxiliary machine 30 so as to restrict the fluctuations in voltage and current due to the temperature raising operation of the main INV 21 from exceeding the tolerance of the auxiliary-side smoothing capacitor 34. This restricts ripples from entering the auxiliary-side smoothing capacitor 34 from the main-side electric circuit 40. Therefore, component failure and shortening of the lifespan of the high-voltage auxiliary machine 30 can be restricted.

(3) The high-voltage auxiliary system of the third embodiment may include plural high-voltage auxiliary machines 30. In this case, the auxiliary ECU 35 cuts off the electrical connection between one or more high-voltage auxiliary machines 30 and the main-side electric circuit 40. This completely restricts ripples from entering the high-voltage auxiliary machine 30, which is electrically disconnected from the main-side electric circuit 40 that connects the temperature raising device and the high-voltage battery 10. Therefore, while restricting component failure and shortening of the lifespan of the high-voltage auxiliary machine 30, it is possible to prioritize heating of the high-voltage battery 10 by the main INV 21, thereby enabling the high-voltage battery 10 to be heated in a short period of time.

Fourth Embodiment

A fourth embodiment will be described. The fourth embodiment is different from the first embodiment in that the configurations of the high-voltage auxiliary machine 30 and the battery temperature control device 50 are changed, but the rest is similar to the first embodiment, so only the parts that differ from the first embodiment will be described.

Figure 11:
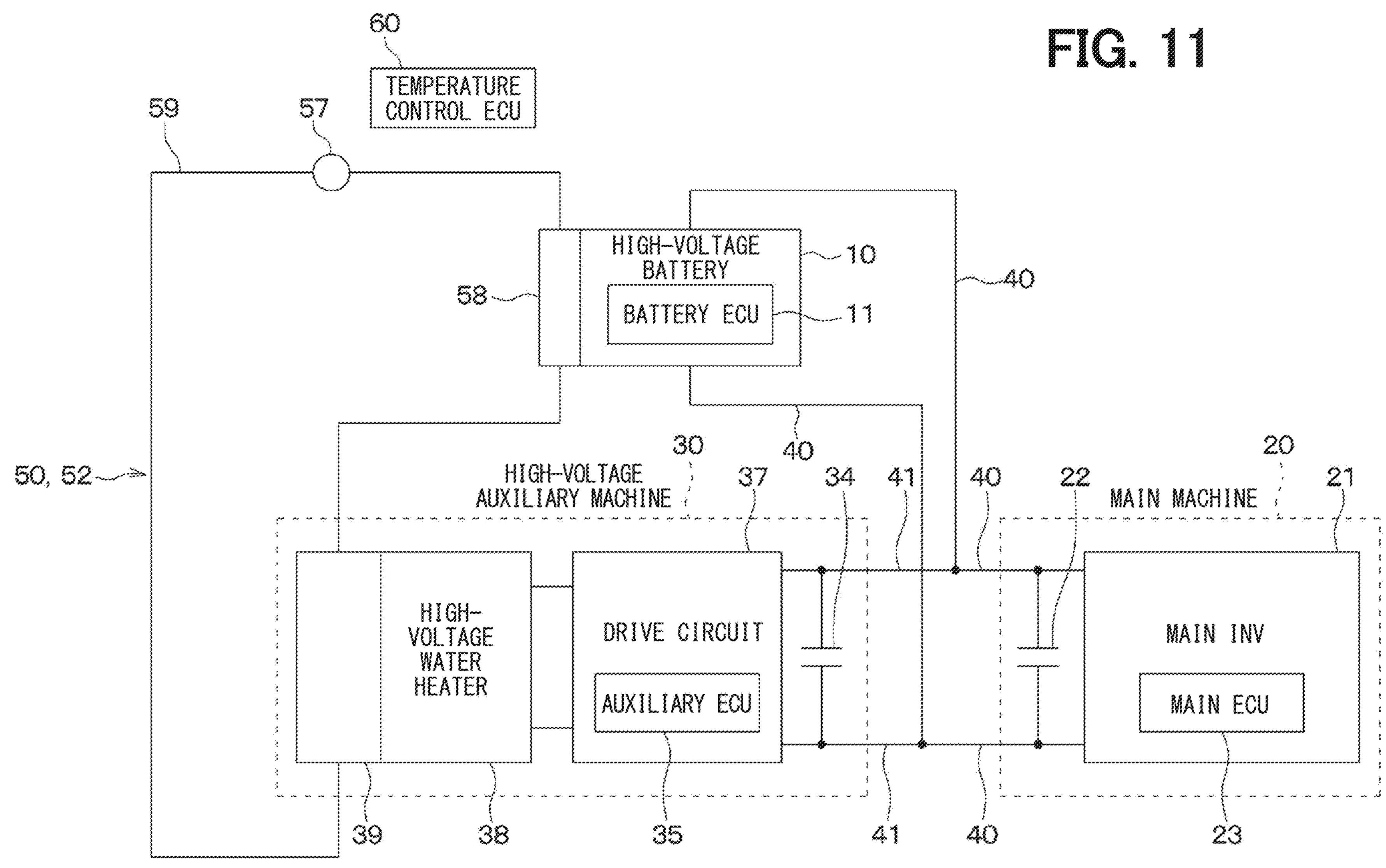
FIG. 11 is a schematic configuration diagram of a high-voltage auxiliary system according to a fourth embodiment.

As shown in FIG. 11, in the high-voltage auxiliary system of the fourth embodiment, the high-voltage auxiliary machine 30 has a drive circuit 37, a high-voltage water heater 38, and an auxiliary-side smoothing capacitor 34. The drive circuit 37 is supplied with power from the auxiliary-side electric circuit 41 that is connected in parallel to the main-side electric circuit 40. The drive circuit 37 controls the power supplied from the high-voltage battery 10 to the high-voltage water heater 38, thereby driving the high-voltage water heater 38. The high-voltage water heater 38 heats the coolant flowing through a heater-side heat exchanger 39. The auxiliary-side smoothing capacitor 34 smoothes the voltage supplied from the high-voltage battery 10 to the drive circuit 37.

The drive circuit 37 includes the auxiliary ECU 35. The auxiliary ECU 35 of the fourth embodiment is also an example of electronic control device.

The battery temperature control device 50 provided in the high-voltage auxiliary system of the fourth embodiment is configured by the coolant circuit 52. The coolant circuit 52 includes a coolant pump 57, a heater-side heat exchanger 39, and a battery heat exchanger 58 connected by a coolant pipe 59.

The coolant pump 57 is an electric pump that circulates the coolant through the coolant circuit 52. The coolant circulating through the coolant circuit 52 is heated by the high-voltage water heater 38 when flowing through the heater-side heat exchanger 39. The heated coolant dissipates heat to the high-voltage battery 10 when passing through the battery heat exchanger 58 provided in the high-voltage battery 10, thereby making it possible to raise the temperature of the high-voltage battery 10.

The battery temperature control device 50 includes a temperature control ECU 60. The battery ECU 11, the main ECU 23, the auxiliary ECU 35, and the temperature control ECU 60 are connected to each other via an in-vehicle LAN using, for example, CAN communication, or a wire harness. The control process executed by the auxiliary ECU 35 in the fourth embodiment is substantially the same as the control process described in the first to third embodiments.

The high-voltage auxiliary system of the fourth embodiment is configured to raise the temperature of the high-voltage battery 10 by combining two means: to raise the temperature of the high-voltage battery 10, the temperature raising operation of the main INV 21; and the battery temperature control by the battery temperature control device 50. The high-voltage auxiliary system of the fourth embodiment can also achieve the same effects as those of the first to third embodiments.

Other Embodiments (1) In each of the embodiments, the main INV 21 is used as an example of the temperature raising device. However, the temperature raising device is not limited to this. The temperature raising device may be configured, for example, as an INV separate from the main INV 21, a separate resonant circuit, or the like.

(2) In each of the embodiments, the high-voltage auxiliary machine 30 is an electric compressor or the high-voltage water heater 38. However, the high-voltage auxiliary machine 30 is not limited to this, and may be various types of on-board electric machine, such as a high-voltage heater for heating air.

(3) The battery temperature control device 50 is exemplified by a device configured by the refrigeration cycle device 51 and the coolant circuit 52 in the second and third embodiments, and by a device configured by a coolant circuit 52 including a high-voltage water heater 38 in the fourth embodiment. However, the battery temperature control device 50 may have any configuration as long as it has a mechanism for adjusting the battery temperature using the refrigeration cycle device 51 or the high-voltage water heater 38.

(4) In each of the embodiments, the auxiliary ECU 35 is used as an example of an electronic control device. However, the electronic control device may be an ECU separate from the auxiliary ECU 35.

(5) In the second embodiment, the battery temperature control device 50 is configured to raise the temperature of the high-voltage battery 10 when the high-voltage battery 10 is at a low temperature. However, the present disclosure is not limited to this. For example, the battery temperature control device 50 may be configured to cool the high-voltage battery 10 when the high-voltage battery 10 is at a high temperature. For example, by reversing the flow direction of the refrigerant flowing through the refrigerant pipe 56 of the refrigeration cycle device 51 in the second embodiment, it is possible to cool the high-voltage battery 10. Specifically, when a bidirectional rotating electric compressor such as a rotary vane type or a rolling piston type is used, it is possible to compress the refrigerant sucked in through the second opening 332 and discharge it from the first opening 331. In this case, the high-temperature, high-pressure gas-phase refrigerant discharged from the first opening 331 dissipates heat to the air passing through the air-refrigerant heat exchanger 55 and is condensed as flowing through the air-refrigerant heat exchanger 55. The liquid-phase refrigerant flowing out of the air-refrigerant heat exchanger 55 is decompressed and expanded when passing through the expansion valve 54, and flows into the water-refrigerant heat exchanger 53 in a gas-liquid two-phase state. The refrigerant flowing through the water-refrigerant heat exchanger 53 absorbs heat from the coolant and evaporates, becoming a gas-phase refrigerant, which is then sucked into the second opening 332 of the compression section 33. On the other hand, the coolant circulating in the coolant circuit 52 dissipates heat to the refrigerant as flowing through the water-refrigerant heat exchanger 53, and is cooled. The cooled coolant absorbs heat from the high-voltage battery 10 when passing through a heat exchanger provided in the high-voltage battery 10, and is thus capable of cooling the high-voltage battery 10.

The present disclosure is not limited to the embodiments described above, and can be modified as appropriate. The above-described embodiments and a part thereof are not irrelevant to each other, and can be appropriately combined with each other unless the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. In each of the above embodiments, when the shape, positional relationship, and the like of the constituent elements and the like are referred to, the shape, the positional relationship, and the like are not limited unless otherwise specified or limited to specific shapes, positional relationships, and the like in principle.

The ECU and the method according to the present disclosure may be achieved by a dedicated computer provided by constituting a processor and a memory programmed to execute one or more functions embodied by a computer program. Alternatively, the ECU and the method according to the present disclosure may be achieved by a dedicated computer provided by constituting a processor with one or more dedicated hardware logic circuits. Alternatively, the ECU and the method described in the present disclosure may be implemented by one or more special purpose computer, which is configured as a combination of a processor and a memory, which are programmed to perform one or more functions, and a processor which is configured with one or more hardware logic circuits. The computer program may be stored in a computer-readable non-transitory tangible storage medium as an instruction executed by a computer.

What is claimed is:

1. A high-voltage auxiliary system for a vehicle comprising:

a high-voltage battery;

a temperature raising device connected to the high-voltage battery via an electric circuit and configured to raise a temperature of the high-voltage battery by utilizing fluctuations in voltage and current;

a high-voltage auxiliary machine electrically connected to the electric circuit and driven by power supplied from the high-voltage battery, the high-voltage auxiliary machine including an electric compressor;

a battery temperature control device including a refrigeration cycle device driven by an operation of the electric compressor to control a temperature of the high-voltage battery; and an electronic control device configured to:

suppress an operating state of the high-voltage auxiliary machine so that a fluctuation in voltage and current due to operation of the temperature raising device and operation of the high-voltage auxiliary machine is smaller than an allowable value of the high-voltage auxiliary machine;

acquire the fluctuation in voltage or current due to the operation of the temperature raising device and the operation of the high-voltage auxiliary machine;

compare the fluctuation with the allowable value to determine whether the fluctuation is smaller than the allowable value;

maintain an operating state of the high-voltage auxiliary machine when it is determined that the fluctuation is smaller than the allowable value; and restrict an operating state of the high-voltage auxiliary machine when it is determined that the fluctuation is larger than or equal to the allowable value, wherein the temperature of the high-voltage battery is raised by both a temperature rise caused by an operation of the temperature raising device and a temperature adjustment caused by the battery temperature control device.

2. The high-voltage auxiliary system according to claim 1, wherein the electronic control device obtains a requested temperature rise capacity requested to the temperature raising device, and suppresses the operating state of the high-voltage auxiliary machine when the requested temperature rise capacity is equal to or greater than a predetermined value so as to restrict fluctuations in voltage and current due to operation of the temperature raising device and operation of the high-voltage auxiliary machine, not to exceed the allowable value of the high-voltage auxiliary machine.

3. The high-voltage auxiliary system according to claim 1, wherein the electronic control device stops the operation of the high-voltage auxiliary machine to suppress the operating state of the high-voltage auxiliary machine.

4. The high-voltage auxiliary system according to claim 1, wherein the high-voltage auxiliary machine is one of a plurality of high-voltage auxiliary machines, and the electronic control device suppresses operation of at least one of the high-voltage auxiliary machines.

5. A high-voltage auxiliary system for a vehicle comprising:

a high-voltage battery;

a temperature raising device connected to the high-voltage battery via an electric circuit and configured to raise a temperature of the high-voltage battery by utilizing fluctuations in voltage and current;

a high-voltage auxiliary machine electrically connected to the electric circuit, the high-voltage auxiliary machine including a drive circuit to control power supplied from the high-voltage battery and a high-voltage water heater driven by power supplied from the drive circuit;

a battery temperature control device configured to control a temperature of the high-voltage battery, the battery temperature control device including a coolant circuit in which coolant circulates, the coolant being heated by the high-voltage water heater; and an electronic control device configured to:

suppress an operating state of the high-voltage auxiliary machine so that a fluctuation in voltage and current due to operation of the temperature raising device and operation of the high-voltage auxiliary machine is smaller than an allowable value of the high-voltage auxiliary machine;

acquire the fluctuation in voltage or current due to the operation of the temperature raising device and the operation of the high-voltage auxiliary machine;

compare the fluctuation with the allowable value to determine whether the fluctuation is smaller than the allowable value;

maintain an operating state of the high-voltage auxiliary machine when it is determined that the fluctuation is smaller than the allowable value; and restrict an operating state of the high-voltage auxiliary machine when it is determined that the fluctuation is larger than or equal to the allowable value, wherein the temperature of the high-voltage battery is raised by both a temperature rise caused by an operation of the temperature raising device and a temperature adjustment caused by the battery temperature control device.

6. An electronic control device for a high-voltage auxiliary system including: a high-voltage battery; a temperature raising device connected to the high-voltage battery via an electric circuit to raise a temperature of the high-voltage battery by utilizing fluctuations in voltage and current; a high-voltage auxiliary machine having an electric compressor electrically connected to the electric circuit and driven by power supplied from the high-voltage battery; and a battery temperature control device including a refrigeration cycle device driven by an operation of the electric compressor to control a temperature of the high-voltage battery, wherein the temperature of the high-voltage battery is raised by both a temperature rise caused by an operation of the temperature raising device and a temperature adjustment caused by the battery temperature control device, wherein the electronic control device includes a processor and a memory configured to:

suppress an operating state of the high-voltage auxiliary machine so that a fluctuation in voltage and current due to operation of the temperature raising device and operation of the high-voltage auxiliary machine is smaller than an allowable value of the high-voltage auxiliary machine;

acquire the fluctuation in voltage or current due to the operation of the temperature raising device and the operation of the high-voltage auxiliary machine;

compare the fluctuation with the allowable value to determine whether the fluctuation is smaller than the allowable value;

maintain an operating state of the high-voltage auxiliary machine when it is determined that the fluctuation is smaller than the allowable value; and restrict an operating state of the high-voltage auxiliary machine when it is determined that the fluctuation is larger than or equal to the allowable value.

7. An electronic control device for a high-voltage auxiliary system including: a high-voltage battery; a temperature raising device connected to the high-voltage battery via an electric circuit and configured to raise a temperature of the high-voltage battery by utilizing fluctuations in voltage and current; a high-voltage auxiliary machine electrically connected to the electric circuit, the high-voltage auxiliary machine including a drive circuit to control power supplied from the high-voltage battery and a high-voltage water heater driven by power supplied from the drive circuit; and a battery temperature control device configured to control a temperature of the high-voltage battery, the battery temperature control device including a coolant circuit in which coolant circulates, the coolant being heated by the high-voltage water heater, wherein the temperature of the high-voltage battery is raised by both a temperature rise caused by an operation of the temperature raising device and a temperature adjustment caused by the battery temperature control device, wherein the electronic control device includes a processor and a memory configured to:

suppress an operating state of the high-voltage auxiliary machine so that a fluctuation in voltage and current due to operation of the temperature raising device and operation of the high-voltage auxiliary machine is smaller than an allowable value of the high-voltage auxiliary machine;

acquire the fluctuation in voltage or current due to the operation of the temperature raising device and the operation of the high-voltage auxiliary machine;

compare the fluctuation with the allowable value to determine whether the fluctuation is smaller than the allowable value;

maintain an operating state of the high-voltage auxiliary machine when it is determined that the fluctuation is smaller than the allowable value; and restrict an operating state of the high-voltage auxiliary machine when it is determined that the fluctuation is larger than or equal to the allowable value.

* * * * *